June 13, 1933.　　　W. H. NICOLAY　　　1,914,281
TRUCK BODY
Filed Oct. 26, 1932　　2 Sheets-Sheet 1
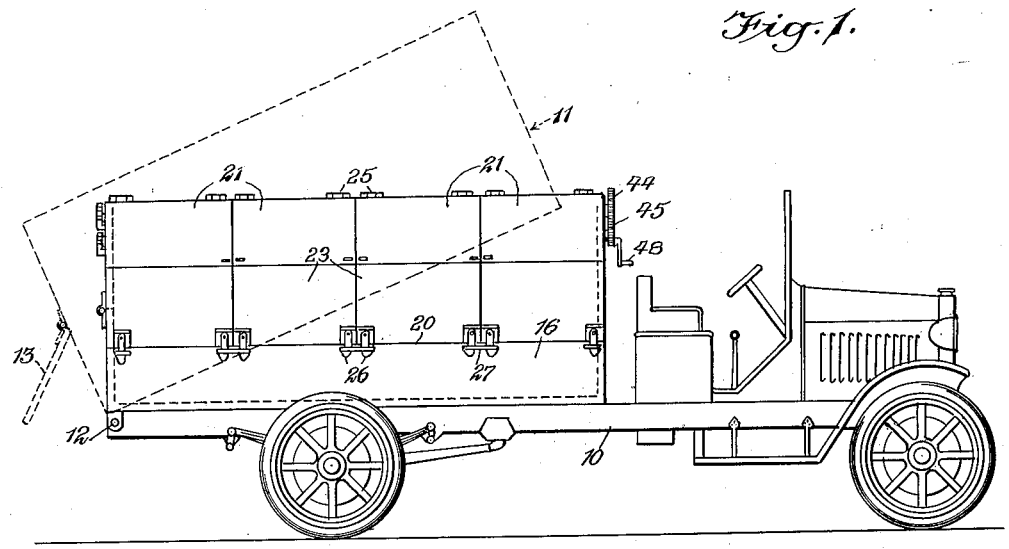
Fig. 1.
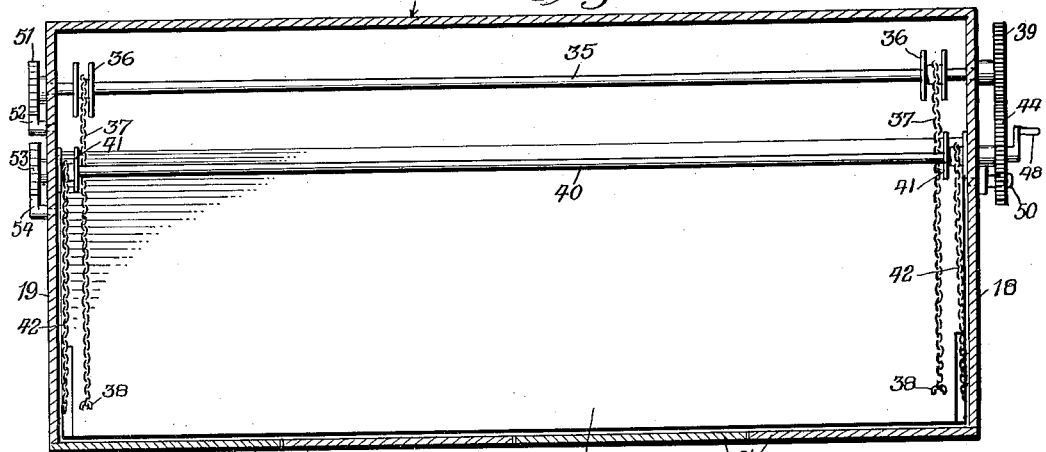
Fig. 2.
Fig. 3.　　　　　　　　　　　　　Fig. 4
WITNESSES
INVENTOR
William H. Nicolay
BY
Munn & Co.
ATTORNEYS June 13, 1933.　　　W. H. NICOLAY　　　1,914,281
TRUCK BODY
Filed Oct. 26, 1932　　2 Sheets-Sheet 2
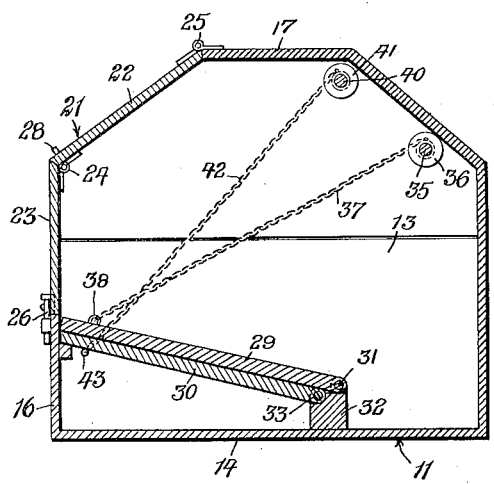
INVENTOR
William H. Nicolay
BY
Munn & Co.
ATTORNEYS
WITNESSES Patented June 13, 1933

1,914,281

UNITED STATES PATENT OFFICE

WILLIAM H. NICOLAY, OF BROOKLYN, NEW YORK

TRUCK BODY

Application filed October 26, 1932. Serial No. 639,719.

This invention relates to an automobile truck body in which material is loaded for transportation. The invention is applicable to truck bodies which are loaded with refuse or waste material such as garbage, ashes, rubbish, etc., from barrels, cans and other receptacles, lifted by men from the sidewalk to be emptied into the body of the truck at one side thereof.

Some of the objects of the invention are: to facilitate loading; to obtain a full capacity load by accomplishing the desired distribution of the material; to save time and labor; to eliminate scattering of dust and dirt; and to produce a body of substantial and efficient design.

With the foregoing, other objects of the invention will appear from the embodiment of the invention which by way of example is described in the following specification and illustrated in the accompanying drawings, in which Figure 1 is a side elevation of a truck having a body embodying the features of the present invention.

Figure 2 is an enlarged section taken on the line 2—2 of Figure 1.

Figure 3 is a fragmentary end view.

Figure 4 is a side view of the end of the body shown in Figure 3.

Figure 5 is a transverse section through the body showing one of the closure sections in closed position and the distributing leaves disposed for loading.

Figure 6 is a view similar to Figure 5, but showing the closure section raised, opening a portion of the body, and one of the distributing leaves swung to its distributing position.

Figure 7 is a view similar to Figure 6 showing both distributing leaves swung to their distributing positions.

Figure 8 is a side view of a portion of the body illustrating the manner in which each closure section is held open.

Referring now more particularly to the drawings, it will be apparent on reference to Figure 1 that there is shown an automobile truck 10 on which a body 11 embodying the features of the invention is mounted. As shown the body 11 is pivoted as at 12 so that it may be moved upwardly to an inclined position for the purpose of dumping the load of material placed therein. The rear end of the body 11 has an end gate 13 which may be opened to permit the discharge of the material. Any suitable mechanism may be employed for the purpose of tilting the body 11 to discharge the material therefrom. The means for tilting the body 11 forms no part of the present invention, and, therefore, has been omitted.

In accordance with the invention, the body 11 is of box-like construction and consists of a bottom 14, side walls 15 and 16, top wall 17 and end walls 18 and 19. The gate 13 together with the end wall 19 close the discharge end of the body 11. The side wall 16 is at the loading side of the body 11. This side wall 16 extends from the bottom 14 part way to the top of the body. The upper edge 20 of the wall 16 forms a rest for the barrels, cans or other receptacles whose contents are emptied into the body 11. The body 11 also includes a plurality of similar closure sections 21. Four of these closure sections 21 are provided in the present instance. Each of the closure sections 21 consists of parts 22 and 23 which are hingedly connected together as at 24, and the section 22 being hingedly connected as at 25 with the top wall 17 of the body. It will be apparent that each closure section 21 is adapted to extend from the top wall 17 to the side wall 16. It also will be apparent that each closure section 21 may be swung upwardly to open a portion of the loading side of the body 11 as shown most clearly in Figure 6. The part 23 of each closure section 21 carries pivoted latch members 26 which are engageable with keepers 27 on the side wall 16 to hold the closure section 21 closed. The latch members 26 of each closure section 21 are engageable with lateral projections 28 on the adjacent closure sections 21 to hold the same open as shown in Figure 8. It is to be understood that one closure section 21 will be opened at a time in carrying out a loading operation.

In accordance with another feature of the invention, means is provided within the body 11 which is movable in relation thereto for the purpose of throwing quantities of the material after being loaded in the body away from the loading side of the body toward its opposite side, to distribute the material and also to make room for additional material. The said means is also adapted to compress the material as well as to distribute the same, thereby making it possible to put a full capacity load in the body 11. In accordance with this feature of the invention, one or more distributing leaves may be employed, and in the present instance two of such leaves are shown, the same being designated 29 and 30. Each of the leaves 29 and 30 is in the form of a plate or panel, and is substantially equal in length to the interior length of the body 11. The lower edge of the leaf 29 is connected as at 31 with a sill 32 on the bottom 14 for rocking, swinging or pivoting movement. The leaf 30 is similarly connected as at 33. Each leaf 29 and 30 is of such dimensions as to reach the side wall 16 somewhat below the edge 20 when swung to its loading position. A strip 34 secured to the side wall 16 on the inside thereof below the edge 20 constitutes means to aid in supporting the leaves 29 and 30 in their loading positions as shown in Figures 5 and 6.

Any practical means may be provided for rocking or swinging the leaves 29 and 30. The means employed in conjunction with the leaf 29 for rocking or swinging the same consists of a shaft 35 supported by the end walls 18 and 19 of the body 11, drums 36 on the shaft 35, cables or chains 37 connected as at 38 with the leaf 29 and with the drums 36 to be wound thereon and unwound therefrom in the rotation of the shaft 35. A gear 39 is secured to the shaft 35. Similar means is employed for rocking or moving the leaf 30, and corresponding parts thereof are designated 40, 41, 42, 43 and 44 respectively. Any suitable means may be employed for rotating the gears 39 and 44, and in the present instance, there is provided a hand-power means consisting of a pinion 45 on one end of a rocker arm 46 mounted on a shaft 47 carried by the end wall 18, a crank 48 on the shaft 47 having a pinion 49 which meshes with the pinion 45. The arm 46 is held in one position by a pin 50 engageable in a hole or opening in the wall 18 so that its pinion 45 will mesh with the gear 39. The arm 46 may be rocked on the shaft 47 to its other position and be held therein by the pin 50 engaged in the hole in the wall 18 so that the pinion 45 will mesh with the gear 44. It will be apparent that it is possible to bring the pinion 45 into driving engagement with either of the gears 39 and 44 for the purpose of rotating the shafts 35 and 40 to swing the leaves 29 and 30 by operating the crank 48. It is to be understood that any other mechanism may be provided for swinging the leaves 29 and 30. The shaft 35 has a ratchet wheel 51 secured thereto, and a pawl 52 pivoted on the end wheel 19, which cooperates with the wheel 51, prevents unintentional return movement of the leaf 29 from any distributing position to which it is moved. A similar ratchet wheel and pawl are employed in conjunction with the shaft 40, the same being designated 53 and 54 to prevent return movement of the leaf 30.

In carrying out the loading of the body 11 one closure section 21 at a time is raised and held in the raised position to open a portion of the loading side of the body 11. The loading may be commenced from the front to the rear or in any other manner. The particular closure section 21 is raised after the latch members 26 are disengaged, whereupon these latch members 26 are swung over the projections 28. The leaves 29 and 30 are brought to the loading position if this has not already been done. Barrels or other receptacles may then be lifted and tilted on the edge 20 of the wall 16 to empty the contents thereof on the leaf 29 which tends to direct the material toward the side wall 15 away from the loading side. After a certain amount of material has been placed into the body 11, the leaf 29 may be swung from its loading position to the position shown in Figure 6 by operating the crank 48, thereby throwing or shifting the material and so distributing the same and also compressing it at the side of the body opposite its loading side. The loading of material into the body 11 may be continued, after which the leaf 30 may be swung upwardly by operating the crank 48 after the pinion 45 has been brought into meshing engagement with the pinion 44. The loading of material may be continued until the body 11 is fully loaded. It will be apparent that by providing the body 11 at its loading side with a relatively low wall 16, the loading of the body will be greatly facilitated since it will not be necessary to lift the barrels, cans or other receptacles to a relatively great height in dumping the contents therefrom. It also will be apparent that by providing a plurality of separate closure sections, each of which may be opened independently of the others, loading operations may be carried out without dust being scattered in the air while loading. It also will be apparent that the material being transported will be confined since it will be completely enclosed when all of the closure sections are closed. It also will be apparent that the material within the body 11 may be readily dumped out of the same by tilting the body 11 on the pivot 12 and opening the end gate 13.

What is claimed:

1. A truck including the combination with a body adapted to be loaded with the material to be transported, of means within said body secured to the body intermediate the sides thereof for movement in relation thereto, for the purpose of throwing the first portion of the load placed in the body from the loading side thereof toward its opposite side to distribute the material and also to make room for additional material.

2. A truck including the combination with a body adapted to be loaded with the material to be transported, of means within said body secured to the body intermediate the sides thereof for movement and movable in relation thereto, for the purpose of throwing the first portion of the load placed in the body from the loading side thereof toward its opposite side to distribute the material and also to make room for additional material, and means operable to cause the movement of said first means.

3. A truck including the combination with a body adapted to be loaded with the material to be transported, of a distributing member movable within the body on a horizontal axis supported on the bottom of the body between the sides thereof, for the purpose of distributing quantities of the material after being loaded in the body.

4. A truck including the combination with a body adapted to be loaded with the material to be transported, of a distributing member extending longitudinally of and movable within the body on a horizontal axis supported on the bottom of the body between the sides thereof, for the purpose of distributing quantities of the material after being loaded in the body.

5. A truck including the combination of a body adapted to be loaded with the material to be transported, said body having a plurality of closure sections each of which is movable to a position to open a portion of the body at the loading side thereof, and means within the body and movable toward and away from the loading side of the body, for the purpose of distributing quantities of the material upon being loaded in the body through the open portion.

6. A truck including the combination of a body adapted to be loaded with material to be transported, said body having a side wall extending from the bottom thereof part way to the top thereof, and a leaf extending within the body parallel to said wall and having its lower side hinged to said bottom spaced from said wall, the leaf being of such dimensions as to reach said wall below its upper edge when swung to one position whereby material may be loaded thereon, said leaf being movable from said position to distribute the material loaded thereon within the body.

7. A truck including the combination of a body adapted to be loaded with the material to be transported, said body having a plurality of closure sections each of which is movable to a position to open a portion of the body at the loading side thereof. A hinged leaf within the body and movable toward and away from the loading side of the body, for the purpose of distributing quantities of the material upon being loaded in the body through the open portion, and means to swing said leaf on its hinge connection to distribute the material.

8. A truck including the combination of a body adapted to be loaded with the material to be transported, said body having a plurality of closure sections each of which is movable to a position to open a portion of the body at the loading side thereof, a hinged leaf within the body and movable toward and away from the loading side of the body, for the purpose of distributing quantities of the material upon being loaded in the body through the open portion, means to swing said leaf on its hinge connection to distribute the material, and means to retain the leaf in various positions.

9. A truck including the combination of a body adapted to be loaded with material to be transported, said body having a loading opening in one side thereof, and leaves extending within the body and having their lower sides hinged to the bottom of the body between the sides of the body, the leaves being of such sizes as to reach to the opening when swung to one position and so hinged as to be disposed in superposed relation in said position, whereby material may be loaded on one leaf and the leaf moved from said position to distribute the material loaded thereon within the body, and whereby material then may be loaded on the other leaf and the latter moved from said position to distribute the material loaded thereon within said body.

WILLIAM H. NICOLAY.